Oct. 5, 1943.          R. M. NARDONE                2,331,077
                    ENGINE STARTING MECHANISM
                      Filed April 8, 1941
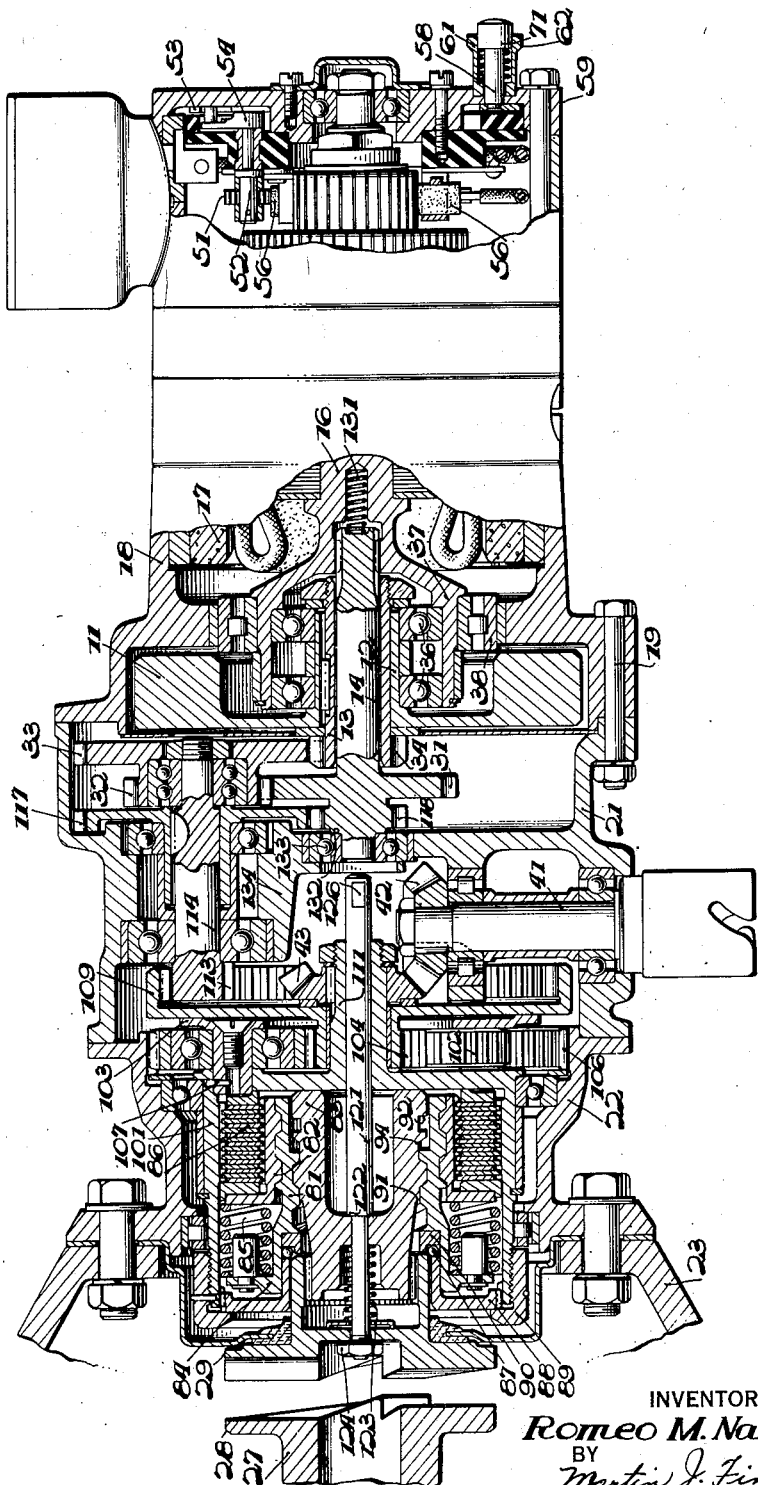
INVENTOR
*Romeo M. Nardone*
BY
*Martin J. Finnegan*
   ATTORNEY Patented Oct. 5, 1943

2,331,077

UNITED STATES PATENT OFFICE

2,331,077

ENGINE STARTING MECHANISM

Romeo M. Nardone, Westwood, N. J., assignor to Bendix Aviation Corporation, South Bend, Ind., a corporation of Delaware Application April 8, 1941, Serial No. 387,541

4 Claims. (Cl. 64—30)

This invention relates to internal combustion engines, and particularly to the starting of an internal combustion engine by imparting initial rotary movement to the engine crankshaft, through the agency of a mechanical torque transmitting starter mechanism.

An object of the present invention is to provide a novel starter construction combining the advantages of inertia operation with those of direct-cranking, yet without sacrificing motor efficiency or energy storing capacity, but on the contrary effecting an increase therein.

Another object is to provide novel means for controlling the torque transmitting capacity of the starter. A feature to this end is the use of auxiliary screw means to modify the torque-limiting clutch setting in response to motion translation by the conventional screw means constituting a part of the torque-limiting clutch assembly.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

In the drawing, the inertia element 11 (flywheel) is shown as having a hub 12 keyed to a sleeve 13 through which runs a shaft 14 driven from the armature shaft 16 of an electric motor whose field coils 17 are supported on a frame fastened to section 18 of the housing. Bolts 19 secure housing section 18 to housing section 21, and a third housing section 22 supports the sections 18 and 21, and is in turn supported on a mounting flange 23 of the engine to be started. A rotatable part 27 of the engine has ratchet teeth 28 for engagement by correspondingly shaped teeth on an engine-engaging member 29, and the latter has a cylindrical extension that is mounted for rotation and limited axial movement within the housing section 23.

In order to make it possible for flywheel 11 to operate satisfactorily at speeds as high as 30,000 R. P. M., for storage of sufficient energy for starting the heaviest aircraft engines now being produced, yet without radically revising the construction of the electric motor, I interpose a step-up gear train between the armature shaft 16 and the flywheel hub 12. This gear train will convert a motor speed of 7500 R. P. M. (which is readily obtainable without changing present motor design) into a flywheel speed of approximately 30,000 R. P. M.; the gears 31, 32, 33, and 34 providing a step-up ratio of 1 to 4, or thereabouts, in the arrangement shown.

The rotation of flywheel 11 at a speed so far in excess of those heretofore employed creates a bearing problem which I have solved by using a two-stage bearing combination comprising bearings 36 on the inner side of armature shaft extension 37, and a bearing assembly 38 on the outer side of said extension 37; the outer races of the bearings 36 being thus urged to rotate at the motor speed, and the ratio of rotation between inner and outer races being correspondingly reduced. The outer race of bearing 38 is, of course, held against rotation, while the inner race rotates with the motor extension 37.

The means for facilitating acceleration of the flywheel 11 independently of electrical energization of the motor windings 17 will now be described. A manually operable transversely disposed shaft 41 is journaled in housing section 21 and terminates in a bevel gear 42 meshing with a second bevel gear 43 constituting the low-speed end of the gear train which leads to the flywheel 11, and includes as its higher speed elements the gears 31, 32, 33, and 34, heretofore referred to; but as the gear 31 is integral with the shaft 14 to which is splined the armature shaft, it will be seen that the armature rotates with the gear train during such manual acceleration of the flywheel 11. This creates a problem because of the spring pressure which would cause the commutator brushes to act as a brake upon the gear train, and thus retard acceleration of the flywheel. This problem is solved by providing means to relax the tension of the brushes, whenever desired, while permitting the brushes themselves to remain in commutating position, rather than attempting to lift them, as in certain prior art patents. Their effect as a retarding agency is thus eliminated, for in the absence of spring pressure the brushes have substantially no braking capacity. To provide for relaxing the spring tension, I use springs 51 of flat metallic material wound spirally about shafts 52 which may be rotated to a limited extent about their individual axes to either wind or unwind the springs 51, according to the direction of rotation of an annular plate 53 to which said shafts 52 are linked by suitable crank mechanism 54—there being a plurality of these crank mechanisms (one for each brush 56) although the drawing shows only one. To rotate plate 53 to the limited extent required, I provide a pin 58 movable in a slot in the endplate 59 of the motor housing, but normally restrained by the pressure of spring 61 upon the detent cup 62. This detent cup 62 must first be pulled outwardly to free the pin 58 for movement in its slot in member 59. The pin terminates in a head 71 to facilitate manipulation thereof.

The novel means for controlling the initial application of turning effort to the engine member 28, and for absorbing the shock of first engagement of the members 29 and 28, will now be described. Referring to the drawing, a motion-translating element 81 is shown as being threaded both internally and externally, and positioned between the cooperating threaded elements 82 and 83; the element 82 being externally splined and hereinafter referred to as the "shell," and the element 83—hereinafter referred to as the "screw-shaft"—having an end portion externally splined for engagement with corresponding splines on the hub of engine-engaging member 29. Element 81 is formed with a flange 84 against which bear coiled springs 85, the said springs being normally—that is, with the parts in the relationships shown—pressed lightly against the conventional friction clutch assembly 86 by reason of the reaction of thrust-bearing assembly 87 upon the element 81 and its flange 84; the bearing 87 being retained by annular plates 88 and 89, the former being splined and the latter threaded to barrel 101 which encloses—and drives—the friction clutch assembly 86.

Ball-race 90 of thrust-bearing assembly 87 is in the path of axial movement of screw-shaft 83; and when shoulder 91 of said screw-shaft engages stop 90, such axial movement ceases. To bring about such axial movement there is provided the usual rod 121 with its shoulder 122 to engage and impart axial thrust to the screw-shaft 83, spring 123, and engine-engaging member 29; the said rod 121 being threaded at its outer end to receive nut 124 and flattened at its inner end 126 to receive an actuating yoke (not shown) corresponding to actuating yoke 40 shown in Fig. 4 of Lansing Patent No. 1,962,398, or to receive any of the various equivalent prior art structures for controlling movement of the "mesh-rod" 121.

The drive from flywheel 11 to the engine-engaging member 29 includes, in addition to the friction clutch assembly 86, a planetary reduction set consisting of planet pinions 102 carried on a rotatable cage 103 and meshing with a central driving pinion 104 and also with an outer annular stationary gear track 106 which, as shown, is integral with housing member 22. The pinion-carrying extensions of rotating cage 103 are secured to barrel 101 by suitable fasteners 107, wherefore the barrel is constrained to rotate with said cage 103 in response to the rotation of driving pinion 104. The pinion 104 is in turn driven from the flywheel 11 through the reduction gears 34, 33, 32, 31, 118, 117, 113, and 109; the last-named gear being integral with pinion 104, and the gear 113 being integral with a shaft 114 journaled in a bearing block 134 constituting an integral part of housing section 21. Also journaled in bearing member 134 is a bearing assembly 133 which coacts with a coiled spring 131 to hold the armature-driven shaft 14 in its proper axial relationship to the parts associated therewith.

In operation, after the flywheel 11 has been accelerated by either of the means (41 or 16) heretofore described, the operator moves mesh-rod 121 to the left, this movement being communicated to the screw-shaft 83 by reason of shoulder 122, and to the engine-engaging member 29 by reason of spring 123. This leftward movement of screw-shaft 83 ceases when shoulder 91 engages stop 90 (as heretofore noted) but in the meantime the engagement of jaws 29 and 28 causes some driving torque to be transmitted to said members 29 and 28 by way of the lightly engaged friction plates 86, the screw sleeve 81, and the screw-shaft 83; but since the latter can move no further to the left—now that shoulder 91 has reached stop 90—screw-sleeve 81 is urged (by the screw action) to the right, to the extent permitted by the spacing of shoulders 94 and 92 on the elements 81 and 83, respectively. This rightward movement of screw-sleeve 81 draws flange 84 correspondingly to the right, and increases correspondingly the pressure of springs 85 upon the friction clutch assembly 86. The torque transmitting capacity of the friction clutch is thus raised to its maximum value by a gradual pressure-applying action that is synchronized with the initial application of driving effort to the engine member 28. The result is a soft, spring-cushioned impact which reduces the stress and strain on the driving and driven parts, and permits use of relatively lighter component elements for any given torque requirements.

If sleeve 81 were splined to shell 82, the force necessary to make it slide through 82 under torque would be considerable and it would be necessary to change the helix angle between 81 and 83 so as to decrease the lead to create the additional force. This additional push, however, would react on thrust-bearing 87 and nut 89 and load these parts excessively. It is to prevent such a situation that sleeve 81 and shell 82 are threaded together, the thread angle being made approximately equal to the angle of friction, namely, between 10° and 15°. The hand of this thread is made such that torque transmitted from 82 to 81 tends to, but does not, pull 81 to the right. The angle is made small enough so that regardless of how much torque is transmitted from one to the other, operating only in themselves, no relative axial movement will result.

When the engine starts, the transmission of torque through the starter mechanism falls to zero and springs 85 then re-expand, carrying sleeve 81 back to its neutral position against thrust-bearing 87. Screw-shaft 83 and jaw 29 are at the same time retracted to their normal positions.

What is claimed is:

1. An engine starter drive including an engine-engaging member, a rotatable barrel, an internally threaded, substantially cylindrical shell concentric of the barrel, an externally threaded shaft having a splined end for driving engagement with said engine-engaging member, a friction plate assembly yieldably connecting said barrel and shell, compressed resilient means for applying pressure to said friction plate assembly, and rotatable screw means interposed between said shell and threaded shaft and movable relatively thereto to vary the degree of compression of said resilient means and thereby control the torque-transmitting capacity of said friction plate assembly.

2. An engine starter drive including an engine-engaging member, a rotatable barrel, an internally threaded, substantially cylindrical shell concentric of the barrel, an externally threaded shaft having a splined end for driving engagement with said engine-engaging member, a friction plate assembly yieldably connecting said barrel and shell, compressed resilient means for applying pressure to said friction plate assembly, and means interposed between said shell and threaded shaft, and threadedly engaging both said shell and shaft, to vary the degree of compression of said resilient means and thereby control the torque-transmitting capacity of said friction plate assembly.

3. Clutch control means comprising, in combination with a rotatable barrel, an internally threaded substantially cylindrical shell concentric of the barrel, an externally threaded shaft having a splined end for driving engagement with a member to be driven, a friction plate assembly yieldably connecting said barrel and shell, compressed resilient means for applying pressure to said friction plate assembly, and rotatable screw means interposed between said shell and threaded shaft and movable relatively thereto to vary the degree of compression of said resilient means and thereby control the torque-transmitting capacity of said friction plate assembly.

4. Clutch control means comprising, in combination with a rotatable barrel, an internally threaded substantially cylindrical shell concentric of the barrel, an externally threaded member to be driven, a friction plate assembly yieldably connecting said barrel and shell, compressed resilient means for applying pressure to said friction plate assembly, and rotatable screw means interposed between said shell and driven member and movable relatively thereto to vary the degree of compression of said resilient means and thereby control the torque-transmitting capacity of said friction plate assembly.

ROMEO M. NARDONE.